United States Patent
Stadelmann et al.

(10) Patent No.: US 9,706,479 B2
(45) Date of Patent: Jul. 11, 2017

(54) FREQUENCY RETENTION AND REUSE

(75) Inventors: Uwe Stadelmann, Fuerth (DE); Fei Luo, Nuermberg (DE); Michael Neuwert, Stein (DE); Michael Esch, Nuermberg (DE)

(73) Assignee: Intel Deutschland GmbH, Neubiberg (DE)

( * ) Notice: Subject to any disclaimer, the term of this patent is extended or adjusted under 35 U.S.C. 154(b) by 1361 days.

(21) Appl. No.: 12/534,145

(22) Filed: Aug. 2, 2009

(65) Prior Publication Data

US 2011/0028153 A1 Feb. 3, 2011

(51) Int. Cl.
*H04W 72/00* (2009.01)
*H04W 48/16* (2009.01)
*H04W 48/12* (2009.01)

(52) U.S. Cl.
CPC ............ *H04W 48/16* (2013.01); *H04W 48/12* (2013.01)

(58) Field of Classification Search
CPC . H04W 48/16; H04W 36/0083; H04W 76/02; H04W 24/02; H04W 48/12; H04W 48/20
USPC ...................... 455/452.2, 450, 434, 451, 453
See application file for complete search history.

(56) References Cited

U.S. PATENT DOCUMENTS

| | | | |
|---|---|---|---|
| 6,332,078 B1* | 12/2001 | Doi ............................... | 455/434 |
| 7,127,212 B2* | 10/2006 | Fattouch ...................... | 455/63.1 |
| 2003/0045241 A1* | 3/2003 | Noerpel et al. .............. | 455/67.1 |
| 2004/0018843 A1* | 1/2004 | Cerwall et al. .............. | 455/450 |
| 2005/0239471 A1* | 10/2005 | Babovic ..................... | 455/452.2 |
| 2006/0240829 A1* | 10/2006 | Hurst ............................ | 455/436 |
| 2009/0059846 A1 | 3/2009 | Burgess | |
| 2009/0137246 A1 | 5/2009 | Xing | |

FOREIGN PATENT DOCUMENTS

EP 1006746 A2 6/2000

* cited by examiner

*Primary Examiner* — Khalid Shaheed
(74) *Attorney, Agent, or Firm* — Schwegman Lundberg & Woessner, P.A.

(57) ABSTRACT

A wireless device may receive a BA-list from a wireless service provider. Before removing any cell frequencies already stored in the wireless device, the wireless device may determine if the BA-list is complete. If the BA-list is not complete, the cell frequencies already stored in the wireless device may be retained, and the cell frequencies received in the BA-list may be added to the storage. However, if the BA-list is complete, the cell frequencies already stored in the wireless device may be removed if they are not in the BA-list.

21 Claims, 3 Drawing Sheets

FREQUENCY RETENTION AND REUSE

BACKGROUND

In digital cellular systems today, for example in the Global System for Mobile communications (GSM) system, mobile stations monitor and measure various signals from a serving network. For example, when a GSM mobile station is initially turned on and enters the idle mode, the mobile station initiates finding a strongest Broadcast Control channel (BCCH) carrier based on the frequencies stored in its Subscriber Information Module (SIM) card. Once the idle mobile station becomes active, also known as entering dedicated mode, and a call is set up to or from the mobile station, the mobile station receives an active BCCH Allocation list (BA-list) on a Slow Associated Control Channel (SACCH) message. Frequencies associated with cells are identified in the active BA-list. The mobile station should periodically measure signal strength of the frequencies in the BA-list. Results from those measurements are reported to the network in periodic measurement reports. The network may use received measurement reports when generating a hand-off candidate list, and the like.

Generally, SACCH messages are broadcast by one or more base stations. These SACCH messages are broadcast to mobile stations on traffic channels. When a mobile station receives a SACCH message, the content thereof may be in the form of a bit map identifying particular BCCH channel frequencies of neighboring cells. The mobile station is tasked with making signal quality measurements on the BCCH channel frequencies, and reporting those measurements to a serving base station. The measurements are incorporated in a measurement report.

Conventionally, the BCCH channel frequencies contained in the SACCH message replace any and all BCCH channel frequencies currently stored in a memory of the mobile station. Moreover, any measurement reports associated with the currently stored BCCH frequencies are deleted when a new or updated list of BCCH channels is received. In particular, conventional mobile stations are not intelligently enabled to discern whether one or more of the received BCCH channel frequencies match one or more of the BCCH channel frequencies currently stored the memory of the mobile station.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different instances in the description and the figures may indicate similar or identical items.

DETAILED DESCRIPTION

The following description describes implementations related to frequency retention and reuse. In one exemplary implementation, a wireless device may receive a BA-list from a wireless service provider. The wireless device may be charged with taking signal strength measurements on the cell frequencies identified in the BA-list. Before removing any cell frequencies already stored in the wireless device, the wireless device may determine if the BA-list is complete. If the BA-list is not complete, the cell frequencies already stored in the wireless device may be retained, and the cell frequencies received in the BA-list may be added to the storage. The wireless device may generate measurement reports, which include signal strength values, for each of the cell frequencies stored in the wireless device. However, if the BA-list is complete, the cell frequencies already stored in the wireless device may be removed if they are not in the BA-list. The wireless device may generate measurement reports for the cell frequencies in the BA-list.

Figure 1:
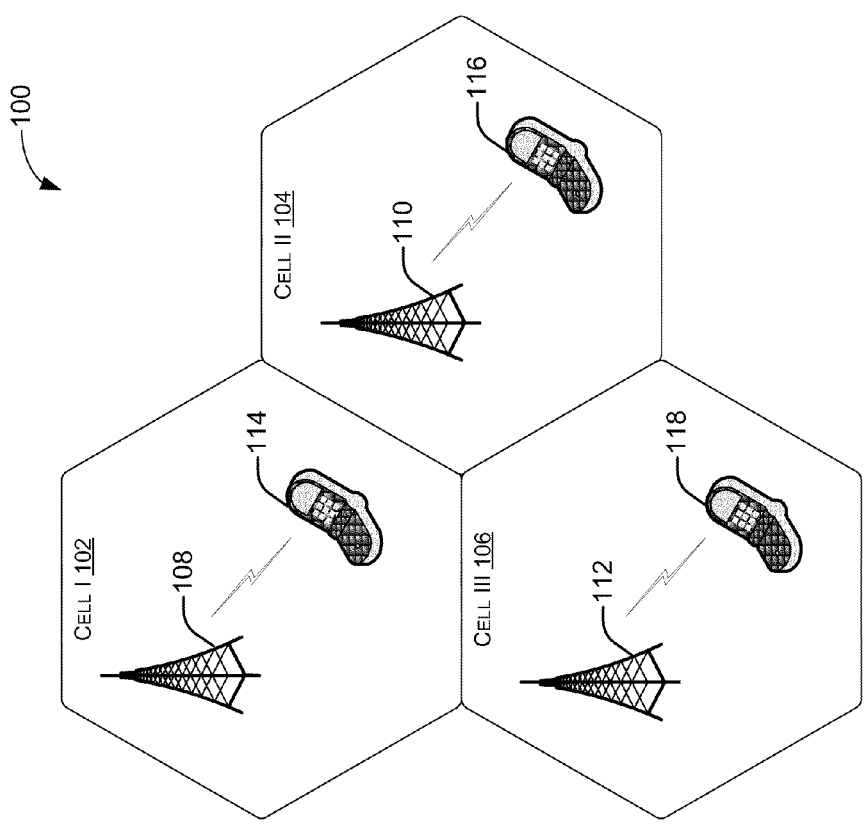
FIG. 1 illustrates an exemplary cellular mobile radio system that may include devices that may incorporate frequency retention and reuse implementations described herein.

To provide a context for the frequency retention and reuse implementations described herein, a general discussion of a cellular mobile radio system will first be provided. FIG. 1 illustrates an exemplary cellular mobile radio system 100 that may include devices that incorporate the described frequency retention and reuse procedures (methods) and devices (apparatuses). In FIG. 1, three cells (cell I 102, cell II 104 and cell III 106) are illustrated. As those skilled in the art appreciate, a cellular radio system may contain many more cells than the number illustrated in FIG. 1. For purposes of this illustration, the network system 100 shown in FIG. 1 may be considered to be an isolated portion of a larger wireless system, only three cells (cell I 102, cell II 104 and cell III 106) of which are shown.

Within each of the cells (cell I 102, cell II 104 and cell III 106), there is a respective base station 108, 110, and 112 serving a given cell 102, 104 or 106. The base stations 108, 110, and 112 may have omni-directional antennas and be located in the vicinity of the centers of the cells. However, as illustrated, those skilled in the art appreciate that base stations may be located in other areas of a corresponding cell. For example, base stations may be positioned at the intersection of three adjacent cells and have sectorized antennas so that the three base stations are capable of serving three different cells.

Also illustrated in FIG. 1 are a plurality of mobile stations 114, 116 and 118. The mobile stations 114, 116 and 118 may move within each corresponding cell 102, 104 or 106 and from one cell 102, 104 or 106 to another cell 102, 104 or 106. A mobile switching center (not illustrated) may be coupled to each of the base stations 108, 110, and 112 by way of cable or wireless connection. Moreover, the mobile switching center may be coupled to a fixed public switched telecommunication network (not illustrated).

The base stations 108, 110 and 112 and the mobile stations 114, 116 and 118 may exchange information over a wireless connection. Such information may include Slow Associated Control Channel (SACCH) messages, BCCH Allocation lists (BA-lists), and the like. Information exchanged between the base stations 108, 110, and 112, or other entity in the network system 100, and the mobile stations 114, 116 and 118 may be included in one or more wireless signals exchanged between the devices. In general, any message and associated carrier signal may be used to implement the frequency retention and reuse implementations described herein. Moreover, the frequency and retention and reuse implementations described herein may be used or implemented by any cellular protocol. Such protocols include, to name a few, Global System for Mobile communications (GSM), Code Division Multiple Access (CDMA), Wideband Code Division Multiple Access (WCDMA), and the like.

Figure 2:
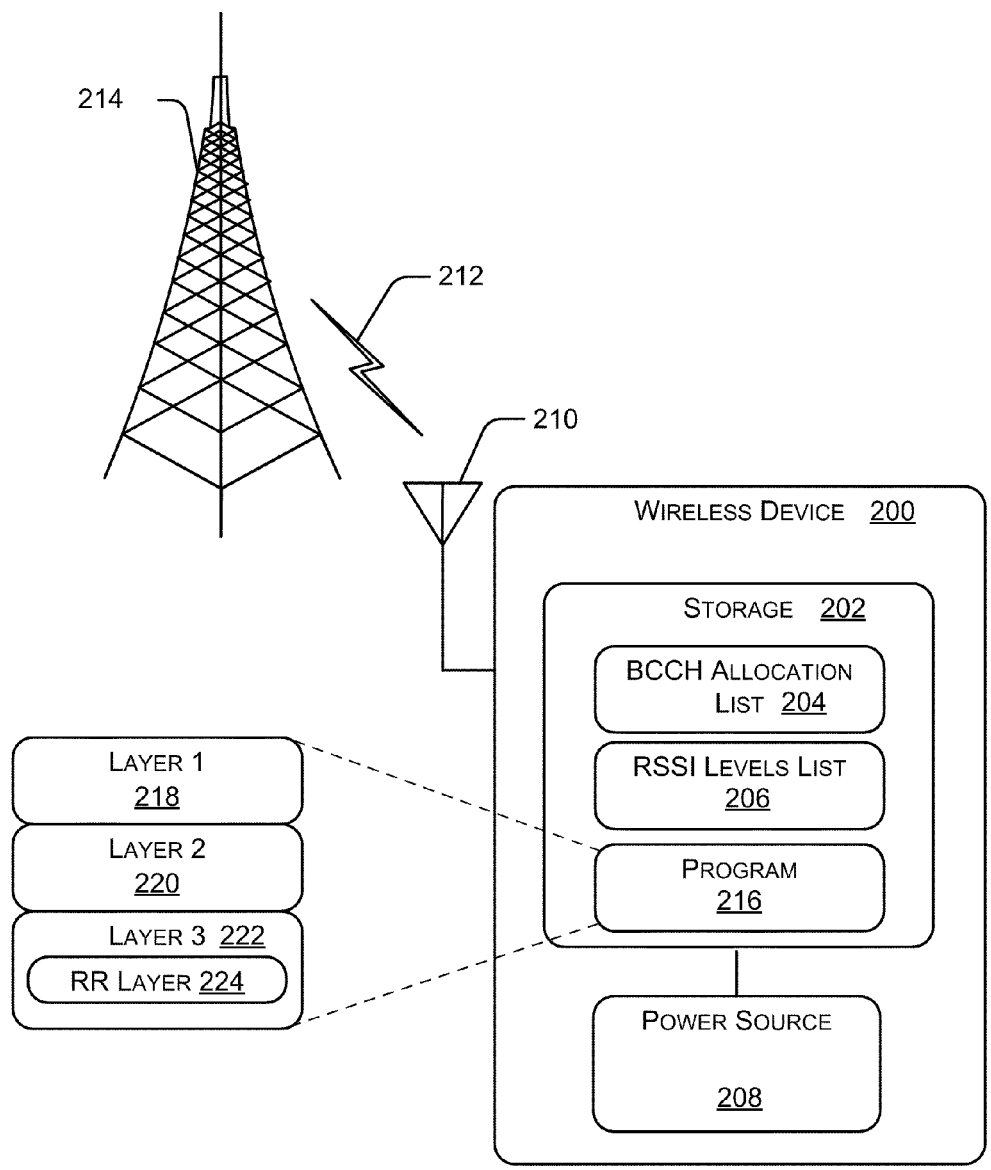
FIG. 2 is a block diagrammatic view depicting a wireless device (i.e., apparatus) 200 may include functional aspects that enable frequency retention and reuse implementations described herein.

FIG. 2 is a block diagrammatic view depicting a wireless device (i.e., apparatus) 200 may include functional aspects that enable frequency retention and reuse implementations described herein. For purposes of the non-limiting example, the wireless device 200 is presumed to include various resources that are not specifically depicted in the interest of clarity. One such resource may be a processor that may be used to execute computer-readable instructions associated and stored in the wireless device 200.

The wireless device 200 may include a storage 202. The storage 202 may include, among other possible features, a BA-list 204 that identifies a number of cells that the wireless device 200 is monitoring. In one implementation, the wireless device 200 may monitor the cells identified in the BA-list 204 by measuring Received Signal Strength Indicator (RSSI) levels of the cells. The measured RSSI levels may be stored in the storage 202. The measured RSSI levels of the cells listed in the BA-list 204 may be stored in a RSSI levels list 206. The RSSI levels list 206 may also include the cell frequencies associated with the stored RSSI levels. The data stored in the list 206 may be used to create measurement reports for communication to one or more network entities associated with a wireless network system, such as the network system 100.

The wireless device 200 may further include a source of electrical energy or a "power source" 208. In one or more implementations, the power source 208 is defined by one or more batteries. Other types of electrical energy may also be used. In any case, the power source 208 may be coupled so as to provide electrical energy to the storage 202 and devices associated with the wireless device 200. In this way, the wireless device 200 is presumed to be operable in a portable manner.

The wireless device 200 may further include an antenna 210. The wireless device 200 is presumed to operate by way of wireless signals 212 between the antenna 210 and a wireless network. A single cellular tower 214 is depicted in the interest of simplicity. The cellular tower 214 may be associated with a base station, such as one of the base stations 108, 110, or 112 illustrated in FIG. 1. The associated base station may deliver messages to the wireless device 200. One or more of those messages may include one or more cell frequencies that the wireless device 200 is to monitor (e.g., measure). Those one or more cell frequencies may be included in the BA-list 204, or any other list associated with the wireless device 200. In one implementation, the messages delivered by the base station are SACCH messages.

It is to be understood that other resources (not shown) of a corresponding wireless network are also present and operative as needed so as to enable the wireless device 200 to perform its various functions (cellular communications, Internet access, etc.). The wireless device 200 is a general and non-limiting example of countless devices and systems that may be configured and operating in accordance with the implementations described herein.

The storage 202 of the wireless device 200 may include a program 216 that includes a layer 1 protocol layer 218, layer 2 protocol layer 220, and a layer 3 signaling protocol layer 222 that includes at least a radio resource layer (RR layer) 224. It will be understood that the layers may be implemented as software modules, which may also be described as software "entities." In accordance with a common nomenclature for licensed wireless services, layer 1 is the physical layer, i.e., the physical baseband for a wireless communication session. The physical layer is the lowest layer of the radio interface and provides functions to transfer bit streams over physical radio links. Layer 2 is the data link layer. The data link layer provides signaling between the mobile station and the base station. The RR layer 224 is concerned with the management of an RR-session, which is the time that a mobile station is in a dedicated mode, as well as the configuration of radio channel, power controller, discontinuing transmission and reception, and handovers.

Specifics of exemplary procedures are described below. However, it should be understood that certain acts need not be performed in the order described, and may be modified, and/or may be omitted entirely, depending on the circumstances. Moreover, the acts described may be implemented by a computer, processor or other computing device based on instructions stored on one or more computer-readable storage media. The computer-readable storage media can be any available media that can be accessed by a computing device to implement the instructions stored thereon.

Figure 3:
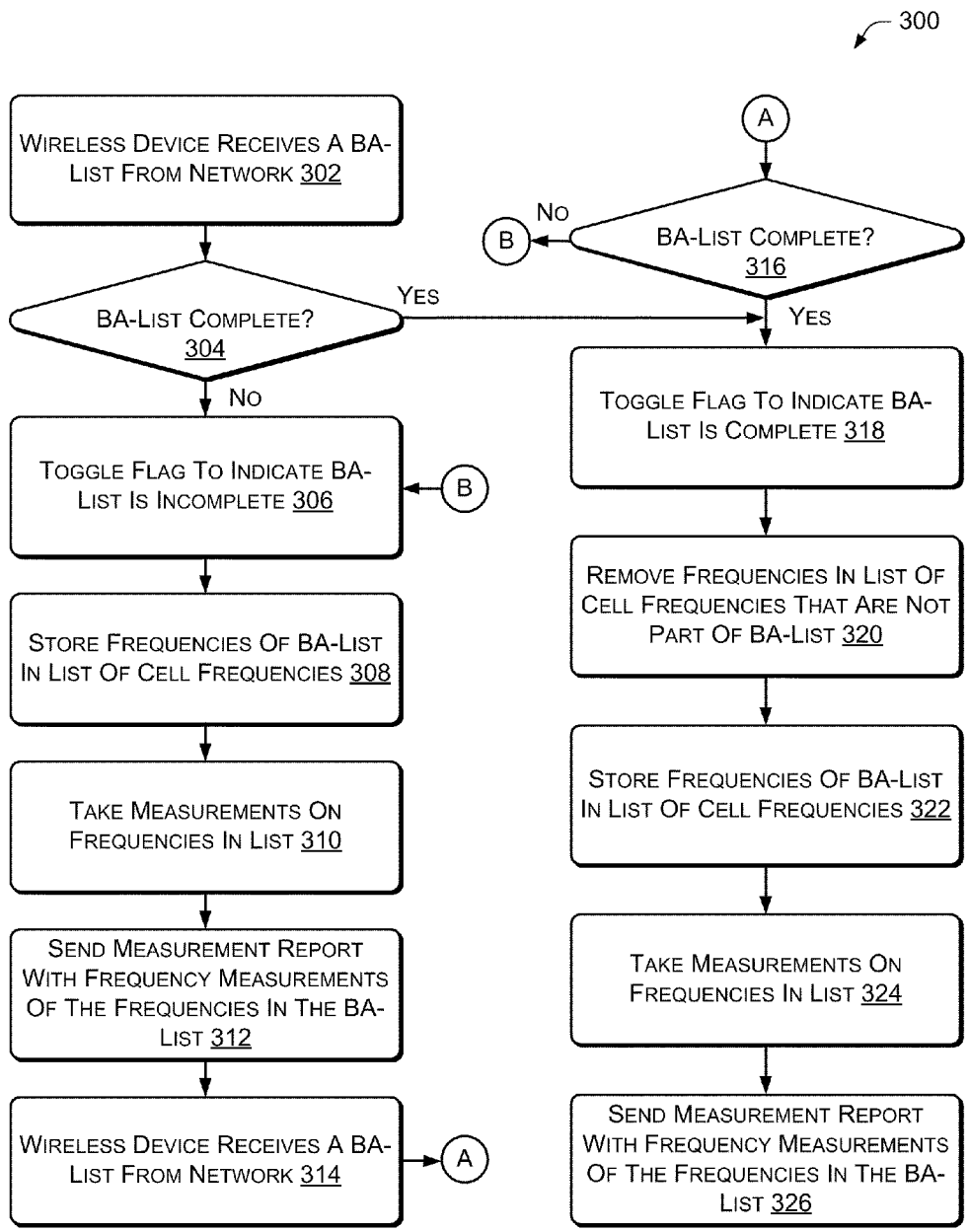
FIG. 3 illustrates an exemplary procedure that implements frequency retention and reuse in accordance with the frequency retention and reuse implementations described herein.

FIG. 3 illustrates an exemplary procedure 300 that implements frequency retention and reuse. In one implementation, the described acts may be implemented by the wireless device 200 illustrated in FIG. 2. Moreover, the described acts may involve one or more units associated with the network system or network service provider 100 illustrated in FIG. 1.

At act 302, a wireless device receives a BA-list from a network entity. The network entity may be a base station, mobile switching center, or any other unit associated with a network service provider. The BA-list may include one or more cell frequencies that the wireless device is to monitor. In one implementation, such monitoring includes taking signal strength measurements on the frequencies in the BA-list. At act 304, the wireless device determines if the BA-list is complete. In one implementation, an RR-layer module associated with the wireless device makes the determination at act 304. The wireless device may receive, with a message delivering the BA-list, an indication that the BA-list is complete. Alternatively, the wireless device may receive a separate message that indicates that the BA-list is complete. The message delivering the BA-list may be a SACCH message.

The wireless device having determined that the BA-list is incomplete, at act 306 the frequencies associated with the BA-list are combined with a message that includes a togglable flag that indicates that the BA-list is incomplete. The message may be sent to a layer 1 module. An RR-layer module may send the message to the layer 1 module. The layer 1 module may be responsible for taking the signal strength measurements on the frequencies identified in the BA-list.

The togglable flag may have three states. The first state is to instruct the module (e.g., layer 1) administering storage of frequencies to store the frequencies associated with the BA-list; the second state is to instruct the module administering storage of frequencies to store the frequencies associated with the BA-list and delete any currently stored frequencies that are not in the BA-list; and the third state is to instruct the module administering storage of frequencies that no action is required.

At act 308, the wireless device stores the frequencies identified in the BA-list. If one or more frequencies identified in the BA-list are already in storage, the wireless device will not create duplicate frequency entries in the storage. Moreover, at this stage, any frequencies stored in the storage that are not associated BA-list are maintained in the storage, as are any associated measurement data. In one implementation, the layer 1 module is responsible for the storage of the frequencies associated with cells. At act 310, the wireless device takes signal strength measurements on the frequencies associated with the BA-list. Moreover, the wireless device may take signal strength measurements on the frequencies stored and that are not part of the BA-list.

At act 312, the wireless device formulates measurement reports for the frequencies associated with the BA-list. Moreover, the wireless device may formulate measurement reports for the frequencies stored and that are not part of the BA-list. However, at act 312, only those measurement reports that are associated with frequencies identified at act 302 are sent to the network entity.

At act 314, the wireless device receives another BA-list from the network entity. The BA-list may identify at least one cell frequency identified in the BA-list received at act 302, as well as additional cell frequencies that were not identified in the prior BA-list. At act 316, the wireless device determines if the BA-list is complete. In one implementation, an RR-layer module associated with the wireless device makes the determination at act 316, based on one or messages received from a wireless network. The wireless device may receive, with a message delivering the BA-list, an indication that the BA-list is complete. Alternatively, the wireless device may receive a separate message that indicates that the BA-list is complete. The message delivering the BA-list may be a SACCH message. If the wireless device does not receive an indication that the BA-list is complete, acts 304-314 may be repeated.

However, at acts 316 and/or 304, if the wireless device determines that the BA-list is complete, the procedure moves to act 318. At act 318, the frequencies associated with the BA-list are combined with a message that includes a togglable flag that indicates that the BA-list is complete. The message may be sent to the layer 1 module by way of the RR-module. Again, the togglable flag may have three states. The first state is to instruct the module administering storage of frequencies to store the frequencies associated with the BA-list; the second state is to instruct the entity administering storage of frequencies to store the frequencies associated with the BA-list and delete any currently stored frequencies that are not in the BA-list; and the third state is to instruct the entity administering storage of frequencies that no action is required.

At act 320, the wireless device removes any stored cell frequencies and associated measurement reports that are not identified in the BA-list. That is, any cell frequencies identified in the BA-list and already stored in the wireless device are not removed from the storage. At act 322, the wireless device adds the frequencies identified in the BA-list to the list of cell frequencies stored in the storage. If one or more frequencies identified in the BA-list are already in storage, the wireless device will not create duplicate frequency entries in the storage.

At act 324, the wireless device takes signal strength measurements on the frequencies associated with the BA-list. At act 312, the wireless device formulates measurement reports for the frequencies associated with the BA-list. At act 312, the measurement reports that are associated with frequencies identified at act 314 are sent to the network entity.

Although implementations in relation to cell frequency retention and reuse are described in the foregoing, other parameters stored by a wireless device may also be retained and reused using the principles described herein. For example, a wireless device may store parameters that need to be refreshed at the occurrence of a particular event (e.g., a handover). Based on the retention and reuse implementations described herein, the wireless device may retain stored parameters until it is confirmed that one or more of the stored parameters are not included in an additional set of parameters received by the wireless device.

For the purposes of this disclosure and the claims that follow, the terms "coupled" and "connected" have been used to describe how various elements interface. Such described interfacing of various elements may be either direct or indirect. Although the subject matter has been described in language specific to structural features and/or methodological acts, it is to be understood that the subject matter defined in the appended claims is not necessarily limited to the specific features or acts described. Rather, the specific features and acts are disclosed as preferred forms of implementing the claims. The specific features and acts described in this disclosure and variations of these specific features and acts may be implemented separately or may be combined.

The invention claimed is:

1. A method, comprising:
    storing in storage a first frequency associated with a first cell;
    receiving a second frequency associated with a second cell;
    determining that one or more frequencies associated with a list of frequencies is not stored in the storage; and
    maintaining the first frequency associated with the first cell in the storage after receiving the second frequency associated with the second cell, the maintaining act executed based on the determining that one or more frequencies associated with a list of frequencies is not stored in the storage.

2. The method according to claim 1, wherein the second frequency associated with the second cell is received in a slow associated control channel (SACCH) message.

3. The method according to claim 1, further comprising monitoring an attribute of the first frequency associated with the first cell after receiving the second frequency associated with the second cell.

4. The method according to claim 3, wherein the attribute is a signal strength of the first frequency.

5. The method according to claim 1, further comprising:
    packaging the second frequency with a flag; and
    sending the packaged second frequency and flag to an module administering storage of frequencies associated with cells.

6. The method according to claim 5, wherein the flag is (1) to instruct the module administering storage of frequencies to store the second frequency, (2) to instruct the entity administering storage of frequencies to store the second frequency and delete any currently stored frequencies, or (3) to instruct the entity administering storage of frequencies that no action is required.

7. The method according to claim 5, wherein the flag has at least three togglable states.

8. The method according to claim 1, wherein the storing act stores the first frequency associated with the first cell in a list, and further comprising storing the second frequency associated with the second cell in the list; monitoring a signal strength associated with the second frequency associated with the second cell; and reporting the signal strength associated with the second frequency associated with the second cell to a network entity.

9. A method, comprising:
receiving a first Broadcast Control Channel (BCCH) Allocation list (BA-list) including at least one frequency associated with a cell;
resolving that the BA-list is incomplete;
storing in storage the at least one frequency associated with the cell in a list allocated to store frequencies;
maintaining any other frequencies in the list after the storing of the at least one frequency associated with the cell in the list; and
receiving a network message that indicates that the BA-list is complete.

10. The method according to claim 9, wherein the list allocated to store frequencies includes at least one frequency associated with another cell.

11. The method according to claim 9, further comprising:
receiving a second BA-list including at least one frequency associated with another cell;
resolving that the BA-list is complete; and
storing the at least one frequency associated with the another cell in the list allocated to store frequencies.

12. The method according to claim 11, further comprising removing any cells stored in the list allocated to store frequencies that are not associated with the complete BA-list.

13. The method according to claim 9, further comprising packaging the at least one frequency associated with the cell with a flag, the flag toggled to a state that indicates that the BA-list is incomplete.

14. An apparatus, comprising:
a processor coupled to a storage, the processor enabled to execute computer-executable instructions stored in the storage, the computer-executable instructions including:
a radio resource layer (RR layer) module to receive at least one frequency associated with a cell and generate a flag to be associated with the at least one frequency associated with the cell; and
a layer module to receive the at least one frequency associated with the cell and the flag associated with the at least one frequency.

15. The apparatus according to claim 14, wherein the flag indicates that a BA-list is incomplete.

16. The apparatus according to claim 14, wherein the layer module is a layer 1 module, the layer 1 module further to store the at least one frequency associated with the cell in a list that contains at least one additional frequency associated with another cell.

17. The apparatus according to claim 16, wherein the layer 1 module is further to initiate measuring a signal strength of the at least one frequency associated with the cell, and send the signal strength of the at least one frequency and a signal strength of at least one additional frequency to the RR layer.

18. The apparatus according to claim 17, wherein the RR layer is to further send the signal strength of the at least one frequency to a network entity and discard the signal strength of the at least one additional frequency.

19. A method, comprising:
receiving from a first layer module being associated with computer executable instructions stored in a storage measurement information related to a first cell and second cell; and
selecting measurement information from the measurement information related to a first cell and second cell to send to a network entity, the selected measurement information based on a current Broadcast Control Channel (BCCH) Allocation list (BA-list).

20. The method according to claim 19, wherein the selecting act is performed by a radio resource layer (RR layer) module stored in the storage.

21. The method according to claim 19, wherein the selecting at selects the measurement information related to the first cell, the first cell being listed in the BA-list.

* * * * *